Dec. 21, 1937. S. RUBEN Re. 20,602

VACUUM TUBE

Original Filed Feb. 8, 1930 2 Sheets-Sheet 1

Inventor
SAMUEL RUBEN

By his Attorney M. W. Clephane

Dec. 21, 1937. S. RUBEN Re. 20,602

VACUUM TUBE

Original Filed Feb. 8, 1930 2 Sheets-Sheet 2

Inventor
SAMUEL RUBEN

By his Attorney M. L. Clapham

Reissued Dec. 21, 1937 Re. 20,602

UNITED STATES PATENT OFFICE 20,602

VACUUM TUBE

Samuel Ruben, New Rochelle, N. Y., assignor, by mesne assignments, to Revelation Patents Holding Company, New York, N. Y., a corporation of Delaware Original No. 1,815,931, dated July 28, 1931, Serial No. 426,828, February 8, 1930. Reissue No. 18,367, dated March 1, 1932, Serial No. 582,168, December 19, 1931. This application for reissue June 11, 1936, Serial No. 84,779

8 Claims. (Cl. 250—27.5)

This invention relates to an improvement in vacuum tubes and more particularly it relates to a vacuum tube for the amplification of electrical oscillations. An object of this invention is the provision of a vacuum tube having a high amplification factor with a large power output.

In general, my invention consists of a vacuum tube employing multiple sets of elements so arranged that one set of elements is connected to the input circuit, the other to an output circuit and so connected that the second set produces an amplified response to the energy applied to the input electrodes of the cooperating set of elements. The second set, such as the cathode, grid and plate, are not directly connected to the input circuit as are the elements in tubes of the prior art, but are indirectly coupled through the output circuit of the first set of elements. As applied herein, the term "first set of elements" refers to those elements, as the cathode, grid and plate, which are directly coupled to the input circuit.

Figure 1:
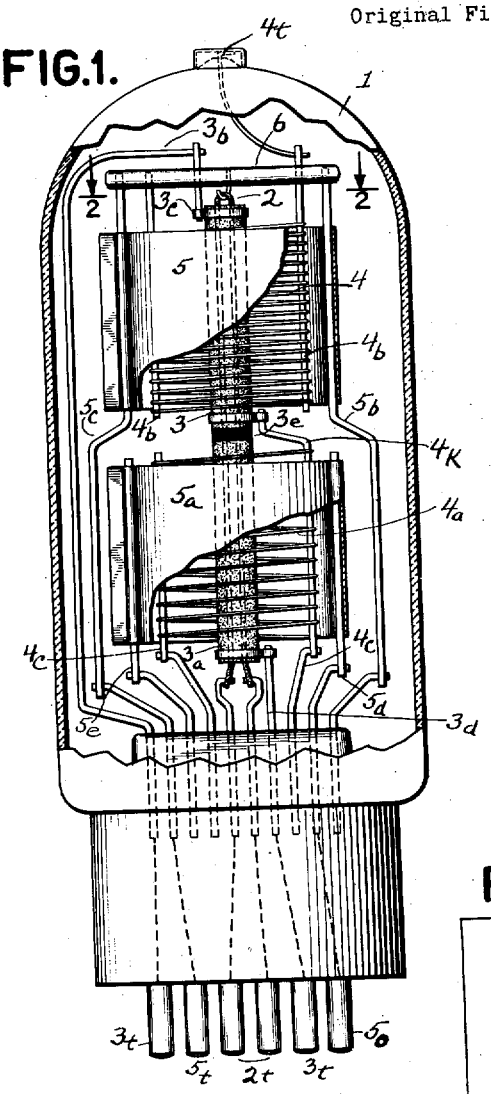
Figure 2:
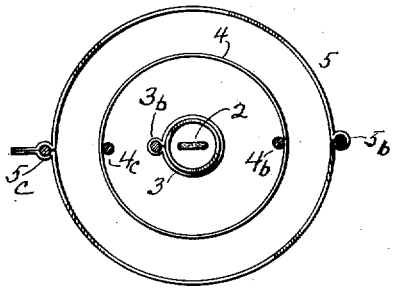
Figure 3:
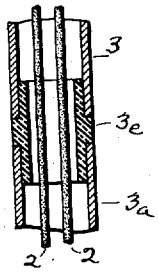
Figure 4:
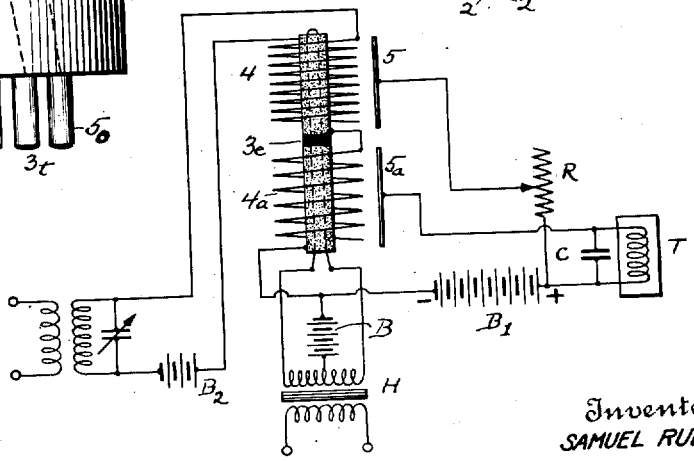
Figure 5:
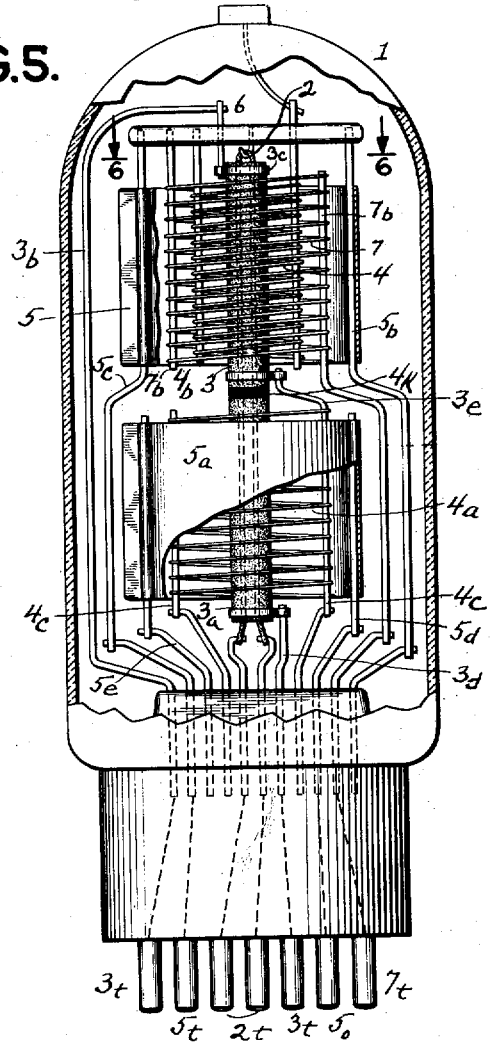
Figure 6:
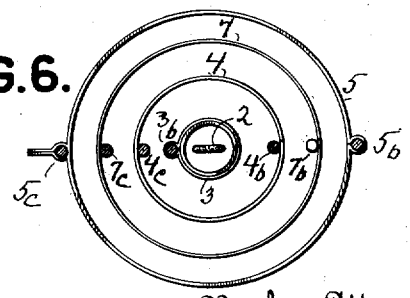

By the use of a tube of the design described, it has been possible to obtain an energy output which is undistorted and of greater density. For a better understanding of the invention, reference is made to the accompanying drawings illustrating an embodiment thereof, in which Fig. 1 represents a vacuum tube having parts of the plate elements so cut away as to better show its construction; Fig. 2 illustrates a section plan view of the tube at 2—2; Fig. 3 represents a section view of the two electron emission elements or cathodes and of the heater element, together with the insulation block separating the cathodes; Fig. 4 shows a circuit in which the tube device is connected; Fig. 5 shows the same tube device with two grids in place of one, in the arrangement of the upper set of elements, and Fig. 6 is a section plan view of this device taken at 6—6.

Referring more particularly to Fig. 1, 1 represents an evacuated glass envelope, 2, the hairpin heater element coated with a refractory insulating oxide; 3, an oxide coated cylindrical nickel cathode supported by conductor wire $3_b$ passing through glass rod 6, from which latter a hook suspends heater element 2. The lower cathode is represented by $3_a$ which is insulated from the upper cathode by insulating member $3_e$. The upper grid is represented by 4, supported by rods $4_b$. These rods are suspended from glass rod 6 and one of the supporting rods, $4_b$, has a terminal outlet at $4_t$. The upper plate 5, is supported by rods $5_b$ and $5_c$, the latter having a terminal at $5_t$. The lower cathode $3_a$ is supported by rod $3_d$ having a terminal at $3_t$; the lower grid $4_a$, supported by rods $4_c$, is connected by conductor $4_k$ with the upper cathode. The lower plate element $5_a$, is supported by rods $5_e$ and $5_d$ with a terminal outlet at $5_o$.

Corresponding elements in Figs. 1, 2, 3 and 4 are indicated by like numerals.

In Fig. 4 at B is a battery for biasing the cathode negative in respect to the heater element which latter is heated from transformer H. At $B_1$ is a source of plate potential for obtaining the plate current C, being a by-pass condenser in the circuit with a translating device T. $B_2$ is a battery or source of potential for maintaining the input grid negative with respect to the cathode 3. The other elements of the circuit correspond to those in the usual arrangement of similar circuits.

Referring to Figs. 5 and 6, the several elements there illustrated correspond with those bearing like numerals in Figs. 1 and 2, except that the additional grid 7 is interposed between grid 4 and anode 3. That grid is supported by rods $7_b$ and has a terminal outlet at $7_t$. This is connected in the circuit as is common practice in circuits employing a screen grid tube.

In the operation of the device illustrated by Fig. 1, when the filament 2 is heated, indirectly heating cathodes 3 and $3_a$, they emit electrons assisted by the plate potential from battery $B_1$. This causes a plate current to flow between the upper cathode and the upper plate and between the lower cathode and the lower grid. In other words, there are two electron discharges; from the upper cathode to the upper plate, and from the lower cathode to the lower grid, this being equivalent to two electron discharges in series with a single source of plate potential. The other and higher density discharge is between the lower cathode and the lower plate. As the lower grid is in the current discharge circuit of the upper electron discharge and as its potential is governed by the density of the upper electron discharge, any modulation of this electron discharge by the control grid having such a form as to give a high amplification constant, causes a variation in the higher density lower electron discharge. If the electron emission from the upper cathode is varied by modulation by the change of potential of the upper or input grid by impressed oscillations the positive potential of the lower or output grid varied accordingly, and as this potential controls the electron emission between the lower cathode and the lower plate, an amplified current change will occur in the output circuit. In a preferred form of this device the upper grid is made with a large number of turns to allow a high amplification constant, and is initially negatively biased so as to reduce the positive potential on the lower grid. The lower grid can be coarser or have fewer turns, so as to offer a low impedance path between lower cathode and its cooperating plate or anode. The output from the input tube circuit can be tuned to radio frequency if desired. The operation of the input circuit and the other commonly employed elements shown is so well known in the art that description is considered unnecessary.

Where radio frequency amplification is especially desired a shielding or screen grid may be introduced between the plate and the control grid. The control grid and the plate are such as are commonly used with the screen grid type of tube to reduce the effects with inter-element coupling.

It is obvious that the relative positions of the sets can be varied.

What I claim is:

1. An electron discharge device comprising an envelope containing a plurality of triode units, each unit consisting of an electron emission element, a grid element and a plate element, said plates being electrically separate within said device, the grid element of one unit being connected directly to the electron emission element of another unit.

2. An electron discharge device comprising an envelope containing a plurality of triode units, each unit consisting of an electron emission element, a grid element and a plate element, said plates being electrically separate within said device, an electron emission element heater, the grid element of one unit being connected directly to the electron emission element of another unit.

3. An electron discharge device comprising an envelope containing a plurality of triode units, each unit consisting of an electron emitter, a grid and a plate, said plates being electrically separate within said device, said electron emitters being insulated from each other, the grid of one triode unit being connected directly to the electron emitter of another triode unit.

4. An electron discharge device comprising an envelope containing a plurality of triode units, each unit consisting of an electron emitter, a grid and a plate, said plates being electrically separate within said device, said electron emitters being insulated from each other, an electron emitter element heater, the grid of one triode unit being connected directly to the electron emitter of another triode unit.

5. An electron discharge device comprising an envelope containing a plurality of triode units, each unit consisting of an electron emitter, a grid and a plate, said plates being electrically separate within said device, and one of said units having an additional grid interposed between its grid and plate, the grid of one of the units being connected directly to the electron emitter of another unit.

6. A vacuum tube comprising an envelope containing a cathode, a grid and a plate element, another cathode, grid and plate element, said plates being electrically separate within said tube, a heater element for indirectly heating said cathodes, said second mentioned grid being directly connected with the first mentioned cathode.

7. A vacuum tube comprising an envelope containing a cathode, a grid and a plate element, another cathode, grid and plate element, said plates being electrically separate within said tube, a heater element for indirectly heating said cathodes, said second mentioned grid being directly connected with the first mentioned cathode, and means for electrically insulating the first mentioned cathode from the second mentioned cathode.

8. A vacuum tube comprising an envelope containing a cathode, a grid and a plate element, another cathode, grid and plate element, said plates being electrically separate within said tube, a heater element for indirectly heating said cathodes, the first mentioned grid offering a higher impedance than the second mentioned grid, said second mentioned grid being directly connected with the first mentioned cathode, and means for electrically insulating the first mentioned cathode from the second mentioned cathode.

SAMUEL RUBEN.